United States Patent [19]

Blomberg et al.

[11] 4,166,657
[45] Sep. 4, 1979

[54] BRAKE ACTUATING AND RELIEVING STRUCTURE

[76] Inventors: Folke I. Blomberg, Duvstigen 4, S-181 40 Lidingö; Jan-Olov M. Holst, Skogsduvevägen 14, S-75252 Uppsala, both of Sweden

[21] Appl. No.: 815,908

[22] Filed: Jul. 15, 1977

Related U.S. Application Data

[63] Continuation of Ser. No. 658,777, Feb. 17, 1976, abandoned.

[30] Foreign Application Priority Data

Feb. 19, 1975 [SE] Sweden .................................. 7501883

[51] Int. Cl.² .............................................. B60T 8/02
[52] U.S. Cl. ................................ 303/116; 188/181 A; 303/119
[58] Field of Search .................... 188/181 A; 303/113, 303/116, 119

[56] References Cited
U.S. PATENT DOCUMENTS

| | | | |
|---|---|---|---|
| 2,868,338 | 1/1959 | Lucien et al. | 188/181 A |
| 2,975,003 | 3/1961 | Sandor | 181/181 A X |
| 3,635,531 | 1/1972 | Okamoto et al. | 303/116 |

FOREIGN PATENT DOCUMENTS

2212912  9/1973  Fed. Rep. of Germany ........... 303/116

*Primary Examiner*—George E. A. Halvosa
*Attorney, Agent, or Firm*—Bell, Seltzer, Park & Gibson

[57] ABSTRACT

An apparatus and method for braking a rotating member in which braking force for retarding rotation of the rotating member is transmitted through an arrangement including a mechanical linkage and a fluid pressure cylinder while a sensor detects the rate of retardation of the rotating member and signals the occurrence of a rate of retardation in excess of a predetermined rate. In accordance with the present invention, relieving force opposing the braking force is applied to the mechanical linkage in response to a signalled excessive rate of retardation, thereby relieving the braking force otherwise retarding rotation of the member.

11 Claims, 9 Drawing Figures

BRAKE ACTUATING AND RELIEVING STRUCTURE

This application is a continuation from parent application Ser. No. 658,777 filed Feb. 17, 1976, and now abandoned.

The desirability of avoiding locking during braking of a rotatable member such as a vehicle wheel has long been acknowledged and significant development effort has been expended toward achieving such anti-lock control. Two examples of proposed brake modulators are found in U.S. Pat. No. Re 28,562 and U.S. Pat. No. 3,833,097, the specifications and drawings of which are hereby incorporated by reference into the description which follows to any extent deemed necessary or appropriate for a full understanding of the present invention.

While arrangements such as those more fully described and shown in the aforementioned United States Patents operate successfully and accomplish greater control over wheel slip and vehicle skidding than is possible in the absence of an anti-lock control, certain difficulties are known to be encountered with the arrangements of those prior patents and other competitive arrangements. Such arrangements, when applied to hydraulic fluid pressure actuated brakes, conventionally require interposition of at least a portion of the control in the normal brake fluid line, interfering with the normal brake fluid circuit and posing installation and maintenance difficulties. Further, such prior anti-lock controls frequently have relatively slow response and present increased risks of failure during operation due to the many components of the brake modulators. Certain of such controls require relatively complicated and expensive manufacturing procedures. As applied to pneumatic brakes, the most common anti-lock controls have operated on the principle of selectively venting compressed air from the braking circuit. Such brake modulators increase demands for compressed air, requiring enlarged, heavy duty compressors and larger compressed air reservoirs. Further, anti-lock controls for pneumatic brakes conventionally suffer from particularly slow response and other of the same shortcomings noted with regard to anti-lock controls for hydraulic fluid brakes.

It is an object of the present invention to overcome the difficulties and deficiencies of prior anti-lock controls by obviating the necessity of any interference in a normal brake fluid circuit. In realizing this object of the present invention, an apparatus and method are contemplated which are of equal applicability to pneumatic brakes and to hydraulic fluid brakes. In either instance, relieving force is applied to a mechanical linkage portion of a brake for opposing braking force normally transmitted therethrough. Such relieving force is applied in response to a signalled excessive rate of retardation of a braked rotating member, so as to relieve braking force otherwise retarding rotation of the member.

Some of the objects of the invention having been stated, other objects will appear as the description proceeds, when taken in connection with the accompanying drawings, in which FIG. 1 is a schematic elevation view, partially in section, of one embodiment of the present invention;

Figure 1:
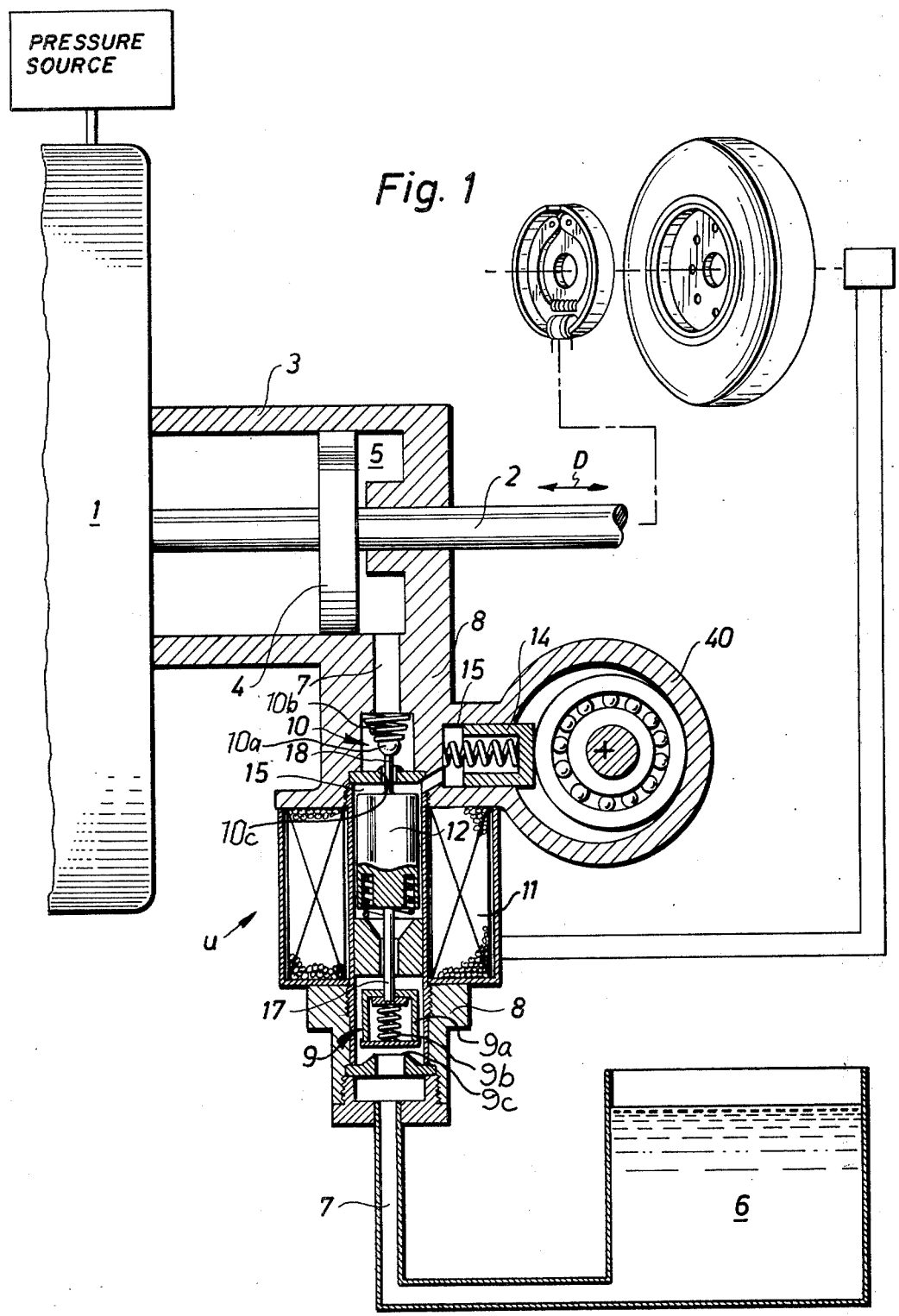

Referring now more particularly to FIG. 1, persons familiar with braking of vehicle wheels and other comparable rotating members are aware that forces urging brake shoes or pads into engagement with a brake drum or disc can be and commonly are applied through a mechanical linkage including a member such as a push rod 2 coupled to such shoes or pads. Further, such persons are familiar with the application of braking force to retard rotation of a rotating member or vehicle wheel by brake means having fluid pressure circuits which include fluid pressure receiving means such as a hydraulic fluid wheel cylinder or the pneumatic wheel chamber indicated at 1 to which compressed air is controllably supplied by a suitable pneumatic means. Normal braking operation occurs with reciprocation relative to the wheel chamber 1 of a mechanical means including the push rod 2, as indicated by the arrow D.

Persons familiar with brakes for vehicle wheels and the like are aware that actuating fluid pressure is commonly delivered to a wheel cylinder or chamber in response to actuation of a foot pedal or the like by a vehicle or machine operator. In the instance of a pneumatic brake, such a pedal is connected to, and controls an air valve by means of a mechanical linkage. In the instance of a hydraulic fluid brake, such a pedal is connected to and controls, a master cylinder by means of a mechanical linkage. As used herein, the term "mechanical linkage" is intended to refer to such linkages as connected either to wheel cylinders or chambers and the like, or to a foot pedal and the like.

Persons familiar with the aforementioned United States patents and other similar prior proposals will have knowledge of the use of sensor means for detecting wheel slip or the rate of retardation of a braked, rotating vehicle wheel and for signalling the occurence of excessive wheel slip or a rate of retardation in excess of a predetermined rate. For that reason, description of such sensors and discussion of the manner in which such a sensor signal may be derived will not be given here at length. The interested reader is referred to the aforementioned prior United States patents for a more complete discussion.

In accordance with the present invention, and in order to respond to a signalled excessive wheel slip or rate of retardation by relieving braking force otherwise acting on a braked, rotating vehicle wheel, relieving means are provided and are operatively connected with a mechanical linkage portion of the vehicle brake means for applying to the mechanical linkage force opposing the braking force normally transmitted therethrough. In the particular form illustrated in FIG. 1, the relieving means takes the form of a hydraulic fluid receiving relieving cylinder means 3 which defines a chamber 5. By supplying pressurized hydraulic fluid to the chamber 5 within the relieving cylinder means, such hydraulic fluid pressure is applied to a piston 4 fixed to the push rod 2 and forming, with that rod, a portion of the means movable relative to the wheel chamber 1.

It is to be understood that the means including the push rod 2 and the piston 4 movable within the relieving cylinder means 3 normally transmits braking force from the wheel chamber 1 in response to the supplying of compressed air thereto. However, in accordance with the present invention, the pressurized hydraulic fluid is supplied to the chamber 5 for acting upon the piston 4 so as to generate relieving force which opposes the braking force.

More particularly, the present invention contemplates that pressurized hydraulic fluid shall be supplied by a brake modulator in the form of a hydraulic fluid displacing means generally indicated at U which has a housing 8 through which hydraulic fluid normally flows in a normally open flow path. A conduit 7 establishes operative communication through the housing 8 between the relieving cylinder means 3 and a reservoir means 6 which contains hydraulic fluid. First and second valve means 9, 10 are arranged within the housing 8 in series flow relation with each other and with the conduit 7 for controlling fluid flow therethrough. The first and second valve means 9, 10 are conditioned for controlling fluid flow by a valve actuator means including a solenoid winding 11 encircling an armature 12 which is shifted axially of the winding in response to energization and de-energization thereof and by the aid of a return spring. The valve means 9, 10 additionally cooperate with an expansible chamber means such as a pump piston 14 mounted for movement within a cylinder 15.

Each of the valve means 9, 10 includes a corresponding valve member 9a, 10a which is biased by corresponding suitable spring means 9b, 10b toward engagement with a corresponding valve seat 9c, 10c. Each valve member 9a, 10a is normally held away from the respective seat 9c, 10c by a respective one of two control pins 17, 18 which extend from the armature 12 which is movable axially within the housing 8 in response to energization and de-energization of the solenoid winding 11. With the winding de-energized (as shown in FIG. 1), the valve means 9, 10 are normally conditioned for free passage of hydraulic fluid in either direction through the conduit 7. Upon energization of the solenoid winding 11 in response to a signalled occurrence of excessive wheel slip or an excessive rate of retardation of the braked, rotating vehicle wheel, the spring bias of the valve members against their respective seats conditions the valve means for blocking hydraulic fluid flow from the chamber 5 of the relieving cylinder 3 to the reservoir 6, while allowing pumped fluid flow from the reservoir 6 to the chamber 5.

During normal braking operations, the mechanical linkage portion of the brake means, including the rod 2 and the piston 4 movable therewith, freely moves in brake applying and brake releasing directions (respectively to the right and left in FIG. 1). During such operation, the movement of the piston 4 relative to the relieving cylinder means 3 causes a continuing reversing flow of hydraulic fluid between the chamber 5 and the reservoir 6. Upon generation of a sensor signal, the winding 11 of the solenoid is energized, shifting the armature 12 to condition the valve means 9, 10 for blocking flow of hydraulic fluid from the cylinder 5 to the reservoir 6, thereby locking the rod 2 against further brake applying movement.

During sensor signal the valve means 9, 10 are conditioned for blocking hydraulic fluid flow from the relieving cylinder means 3 to the reservoir 6 and the pump piston 14 is driven in reciprocating movement by a suitable motive means such as an electrical motor contained within a housing 40. Where an electrical motor is used as the motive means, such a motor may be operated by the sensor or in response to another related signal such as a brake light signal switch. Actuation of the driving motor prior to energization of the solenoid winding 11 can be accommodated inasmuch as reciprocation of the pump piston 14 will not adversely effect normal bi-directional hydraulic fluid flow in the conduit 7 until such time as the valve means 9, 10 are conditioned to control such flow.

Advantage may be taken of this fact to reduce the interval of time required to respond to changes in sensor signals. By way of example, any one of four sensors provided on a four-wheeled vehicle may be allowed to start piston movement for modulators controlling anti-lock functions for all four wheels and, where appropriate, several or all of the modulators may be driven from a common motive means. Thus, an occurrence of excessive wheel slip at any one of four wheels facilitates more prompt response to similar excessive slip at any other wheel in the group. Alternatively, the piston movement may be started in response to the pressure applied to the wheel chambers or cylinders rising above a limit value. Further, the reciprocation of the piston 14 need not be deactivated immediately upon restoration of the modulator to the normal open flow path condition.

As will be appreciated, a pumping action is obtained upon the aforementioned conditioning of the valve means 9, 10, sucking hydraulic fluid from the reservoir 6 and supplying pressurized hydraulic fluid to the chamber 5 of the relieving cylinder means 3. Such pressurized hydraulic fluid acts on the piston 4 to generate relieving force in opposition to the braking force otherwise tending to move the rod 2 in the brake applying direction (to the right in FIG. 1). When the sensor signal stops, the winding 11 is de-energized, free flow of hydraulic fluid through the conduit 7 is again allowed, and the rod 2 can again reciprocate as required for normal braking. This sequence can be repeated as necessary.

It will be understood that the valve actuator means for the valve means 9 and 10 may take other forms than that described above; that the expansible chamber means may similarly vary; and that the motive means for the expansible chamber means may be other than electric. By way of example, the actuator and motive means may both be fluid powered, by pressurized air or hydraulic fluid drawn from available supplies. The expansible chamber means may employ a diaphragm or the like. It is contemplated that other such variations may be made by the person skilled in the art without departing from the invention here described.

Figure 2:
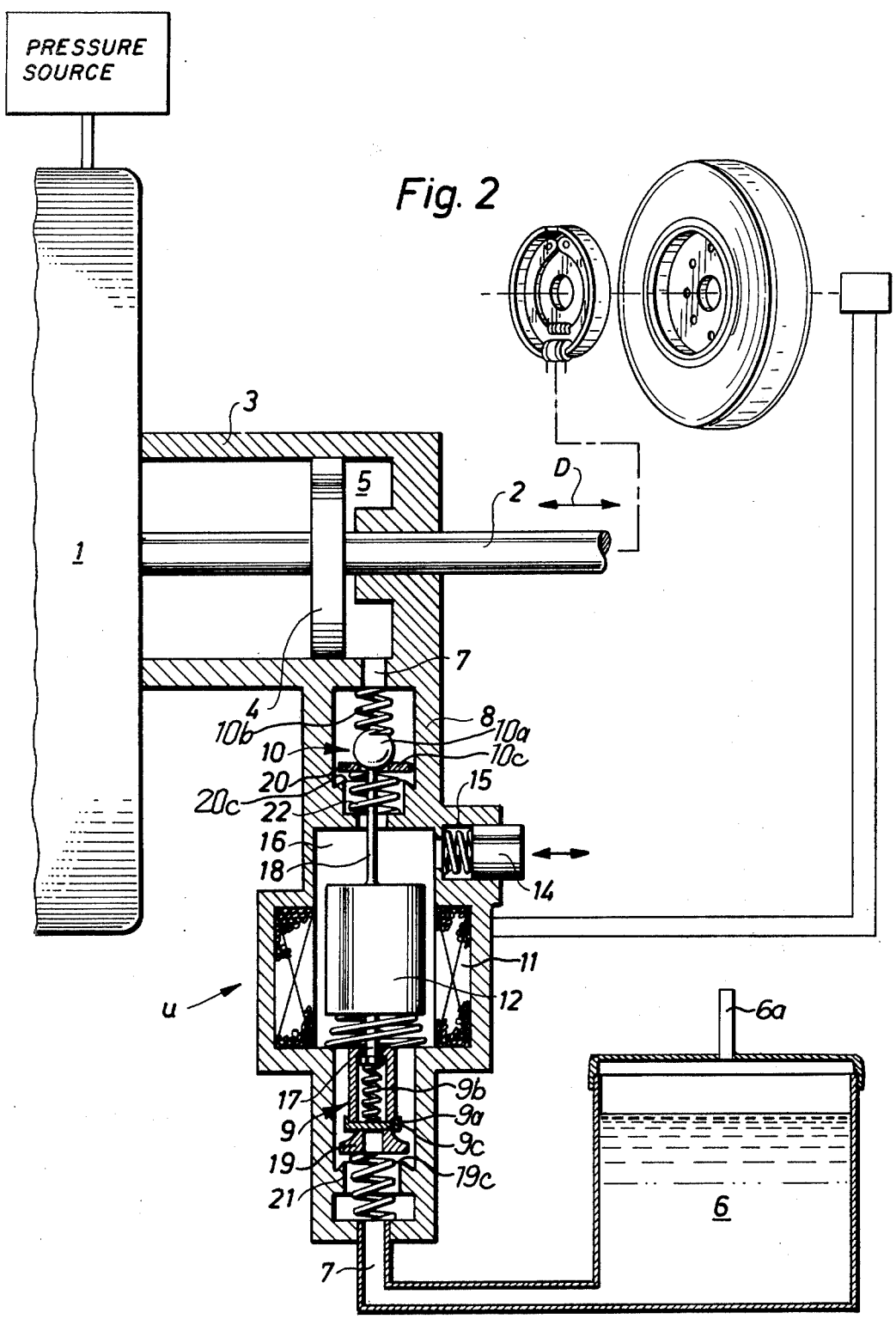
FIG. 2 is a view similar to FIG. 1, showing a modified form of the embodiment of FIG. 1, in which provision is made for increasing the flow of hydraulic fluid.

A modified form of the apparatus of FIG. 1 is illustrated in FIG. 2, where larger flow areas are provided for the valve means 9, 10 during normal brake operation than during anti-lock operation. More particularly, the valve members 9a, 10a of the first and second valve means in the embodiment of FIG. 2 normally seat against seats 9c, 10c formed on respective washers 19, 20. Each of the washers 19, 20 normally is held away from a corresponding seat 19c, 20c by a corresponding biasing spring 21, 22. As a result, larger flow areas for hydraulic fluid are provided during normal operation.

In the specific form illustrated in FIG. 2, this enlargement of flow areas is deemed beneficial in that greater volume reversing flows of hydraulic fluid may be handled and allowing more rapid movement of the rod 2 through any lost motion required before friction surfaces are brought into engagement.

In oscillating piston pumps there is the danger of cavitation during the suction stroke and it can be important to obviate the possibility of volatilizing components of a pumped liquid by assuring that the liquid is always subjected to elevated pressures. Accordingly, it is contemplated that the reservoir 6 may be pressurized, particularly where the arrangement of this invention is used in conjunction with pneumatic brakes. Such a modification is shown in FIG. 2, where the reservoir 6 is closed and pressurizing air is admitted through a supply conduit 6a. Pressurizing air may be admitted continuously or intermittently with brake operation. In the latter instance, pressurizing air may be supplied from the corresponding wheel chamber or, through an appropriate valve, from the central compressed air reservoir.

Figure 3:
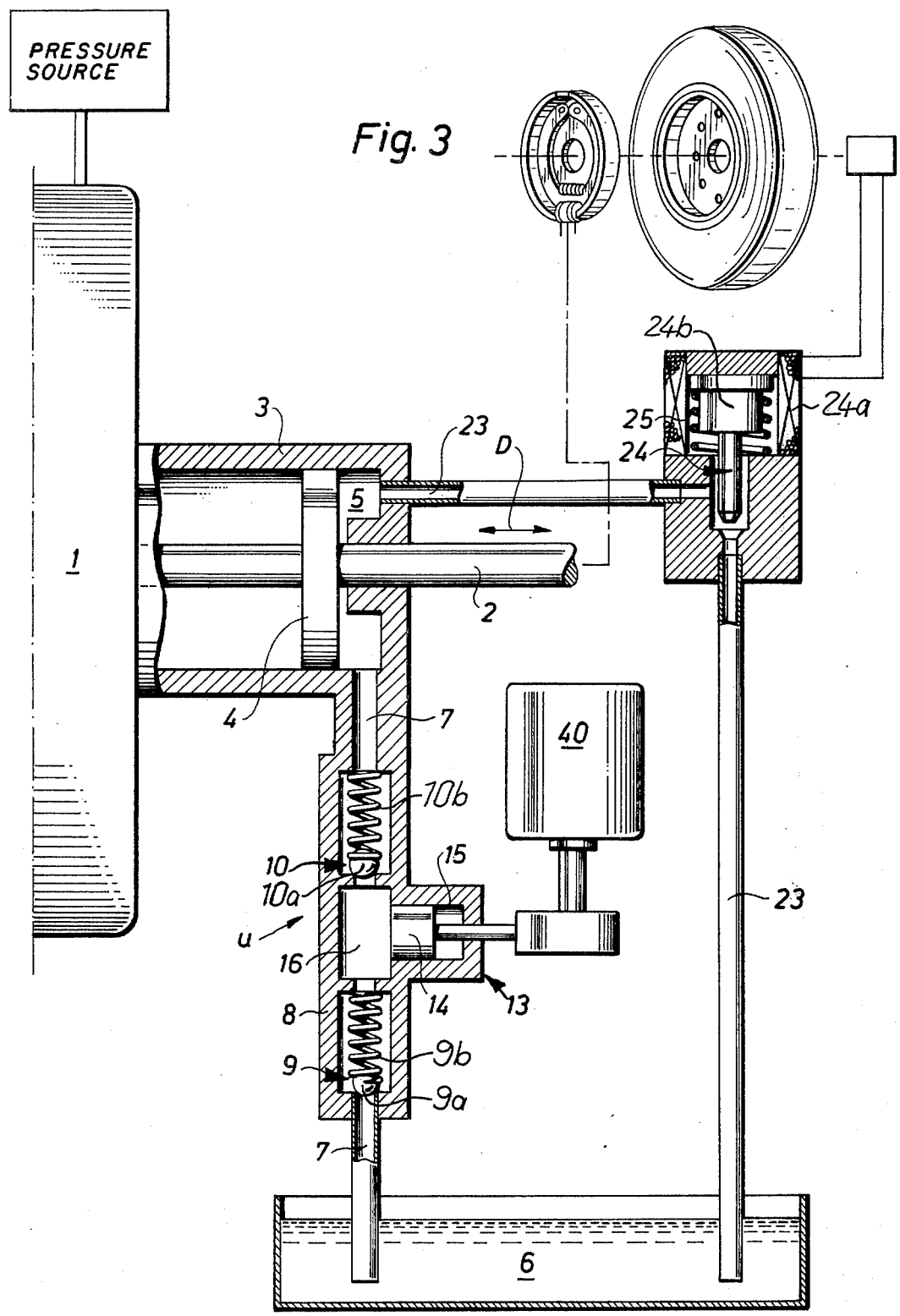
FIG. 3 is a view similar to FIG. 1 of another embodiment of the present invention, in which a return conduit is provided.

The present invention additionally contemplates that the hydraulic fluid displacing means U for supplying pressurized hydraulic fluid to a relieving cylinder means may take other forms. One such form is shown in FIG. 3, where the conduit means for establishing operative communication between the relieving cylinder means 3 and the reservoir means 6 is shown to include a return conduit means 23. A control valve means 24 is interposed in the return conduit means 23 for normally permitting free flow of hydraulic fluid therethrough. The provision of the return conduit means 23 and the control valve means 24 permits simplification of the valve means 9, 10 interposed in the supply conduit 7 while still accommodating operation of the motor 40 for the pump piston 14 either in response to a sensor signal or some other appropriate signal such as a signalled presence of braking pressure. During normal operation, fluid pumped from the reservoir 6 and delivered through the supply conduit 7 is freely returned to the reservoir 6 through the return conduit means 23, thereby accommodating free movement of the mechanical linkage means including the rod 2 and piston 4.

When a signal is received from the sensor, a solenoid winding 24a is energized, acting on an armature 24b so as to overcome the biasing force of a spring 25 and close the control valve means 24. With blocking of the return conduit means and continued supplying of pressurized hydraulic fluid through the supply conduit means 7, a relieving force is generated substantially as described hereinabove.

Figure 4:
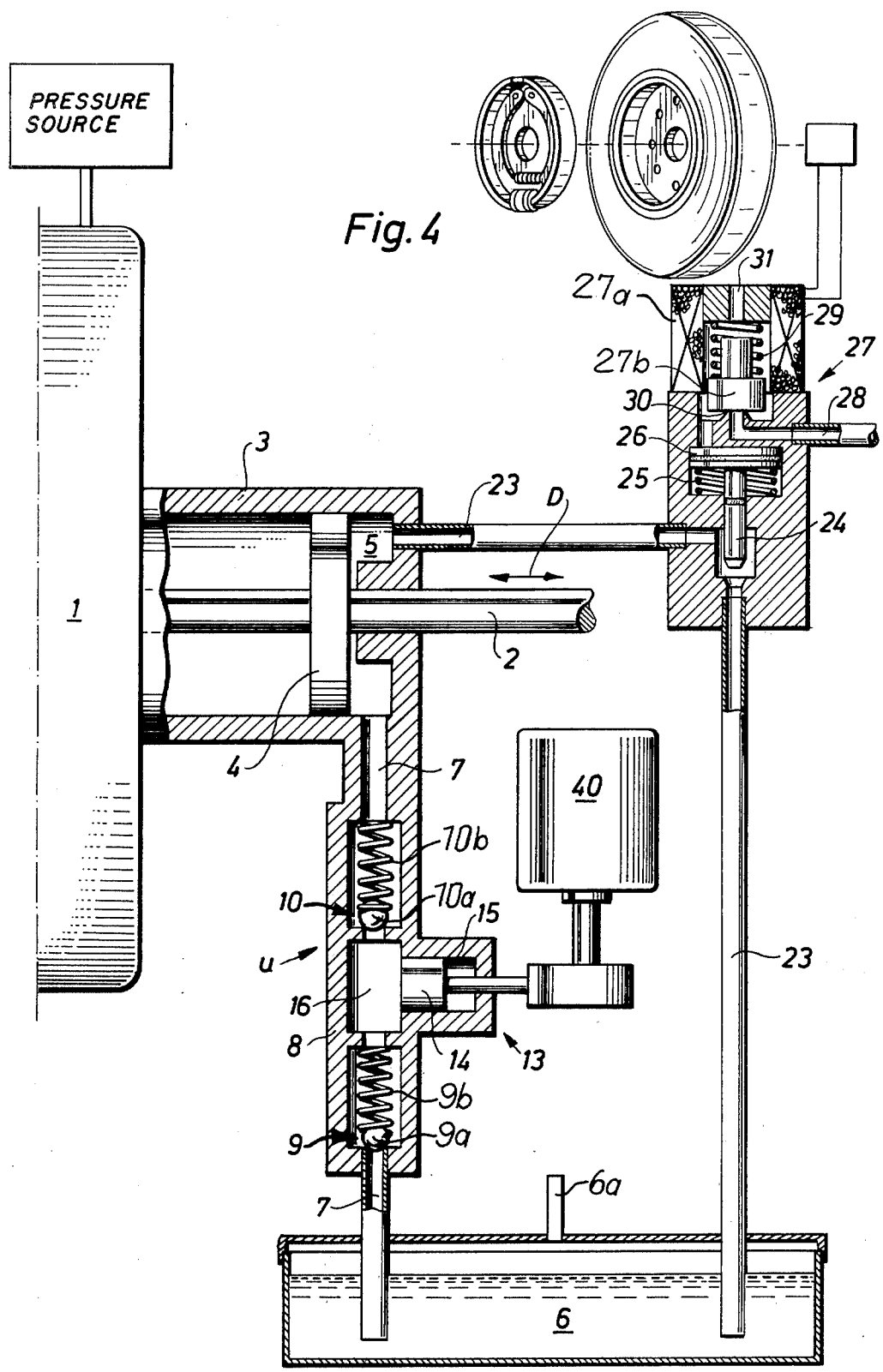
FIG. 4 is a view similar to FIG. 3, showing a modified form of the embodiment of FIG. 3.

A modified form of hydraulic fluid displacing means employing a return conduit is illustrated in FIG. 4, where the control valve means 24 interposed in the return conduit means 23 is controlled by a compressed air servo device 27. In the arrangement of FIG. 4, the control valve means 24 is not directly operated by energization of a solenoid winding and movement of an armature as is the case in FIG. 3. Instead, a compressed air inlet 28 is normally closed by an armature 27b. Upon energization of a solenoid winding 27a, the armature 27b is drawn upwardly against the biasing force of a spring 29 and away from a seat 30 so as to admit compressed air through the inlet 28 and into a space containing a piston 26 operating the control valve means 24. The piston 26 will, as a result, be moved (downwardly in FIG. 4) in a distinct and positive way so that the valve means 24 will close the return conduit means 23. At the same time, the armature 27b seals a vent hole 31.

Upon de-energization of the solenoid winding 27a, the biasing spring 29 will move the armature 27b (downwardly in FIG. 4) to open the vent hole 31 and seat against the seat 30. By means of a small leak passage (not visible in the drawings) provided around or through the armature 27b, compressed air acting on the piston 26 is vented to the atmosphere through the vent hole 31, so that the piston 26 may be moved (upwardly in FIG. 4) by a biasing spring 25 so as to open the return conduit means 23.

As will be appreciated, the pumps employed in the arrangements of FIGS. 3 and 4, may, if desired, take other forms than those shown, such as by being gear pumps and vane type pumps. If a pump not having a non-return valve function is chosen such a valve must be provided.

It is contemplated that the arrangements of FIGS. 3 and 4 are particularly adaptable to use of a single hydraulic displacing means with a plurality of relieving cylinder means. In such an arrangement, relieving cylinder means 3, return conduit means 23, and control valve means 24 are provided for each vehicle wheel or rotatable element, with groups or all sharing a common reservoir and hydraulic displacing means. The common hydraulic displacing means is to be provided with appropriate valving for assuring proper fluid flow distribution. In the instance of an automotive vehicle, the hydraulic displacing means may take the form of a power steering pump or other fluid pump conventionally provided on the vehicle. It is additionally contemplated that the supply and return conduits may communicate with the cylinder through a three-way spool valve which is shifted to supply relieving force and to release such force.

Figure 5:
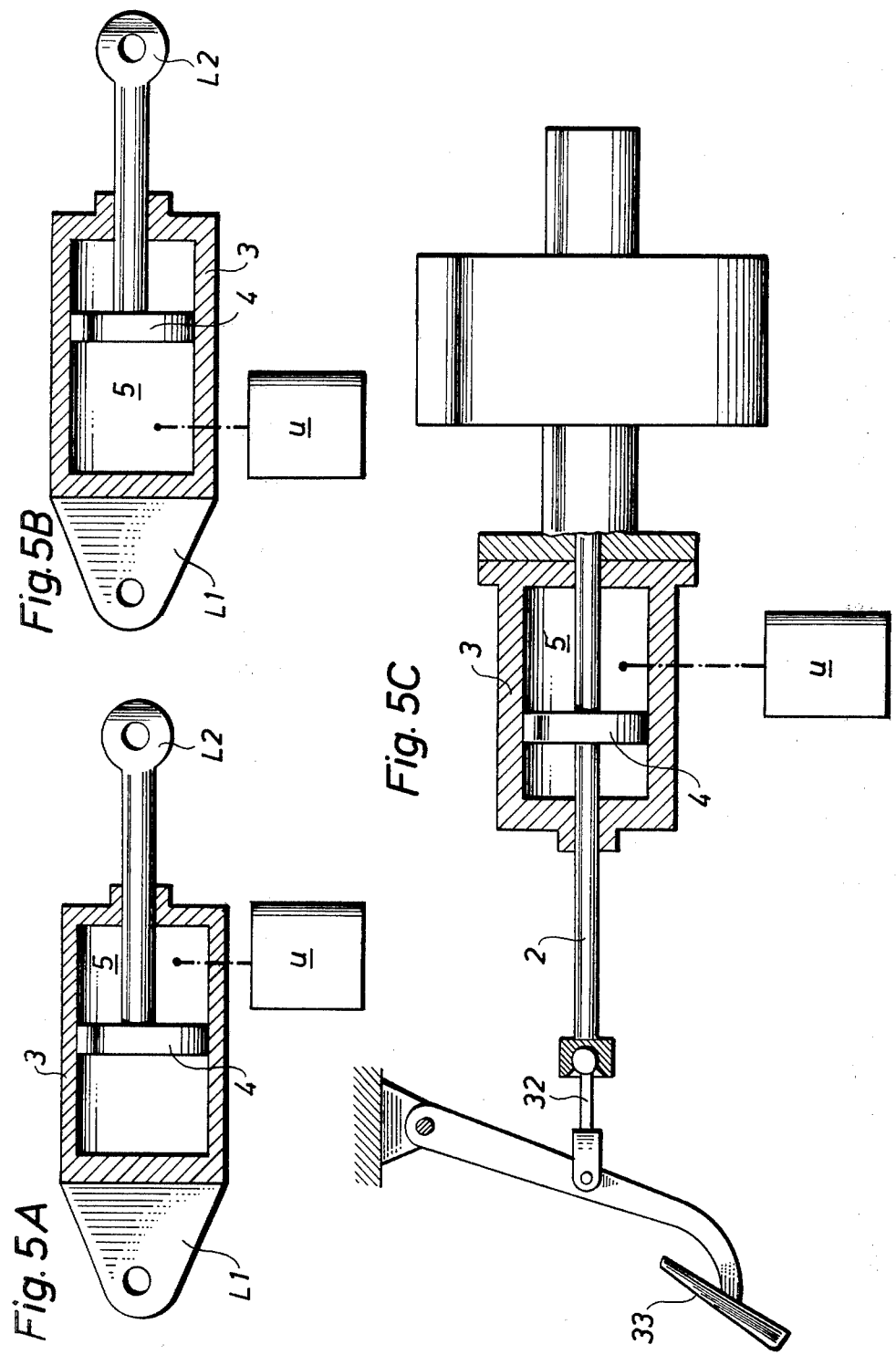
FIGS. 5A through 5C are schematic elevation views, partially in section, illustrating a range of applications of the devices of FIGS. 1 and 2.

Arrangements similar to those of FIGS. 1 through 4 are contemplated as finding utility at other mechanical linkage points in brake means than those which provide the particular embodiments of those figures. Such further variations of arrangements as contemplated by the present invention are shown in FIGS. 5A through 5C. More particularly, FIG. 5A illustrates an application of the device of the present invention to control separation of two links, L-1, L-2 which may be installed in a brake means in such a manner that braking force is transmitted from one link point to another and lengthening of the distance between the link points normally takes place during braking. In accordance with the present invention, the distance between the link points would be shortened through the operation of a hydraulic fluid displacing means U as described hereinabove. FIG. 5B illustrates a related use of the device U of this invention, as applied for preventing relative compression between two links L-1, L-2. FIG. 5C illustrates use of the device U of the present invention for controlling force exerted by a vehicle operator on a master cylinder of the type employed in conventional passenger automobile hydraulic fluid actuated brakes. More particularly, the mechanical linkage extending between the brake pedal 33 and master piston means movable relative to the master cylinder includes a release cylinder means 3 and a hydraulic fluid displacing means U cooperating therewith as described hereinabove. When a driver applies such braking force to the pedal 33 as to lead to excessive slip of a braked, rotating vehicle wheel, opposing force is generated and the brake pedal 33 will be pushed backwardly (to the left in FIG. 5C) to relieve the braking effect.

Figure 6:
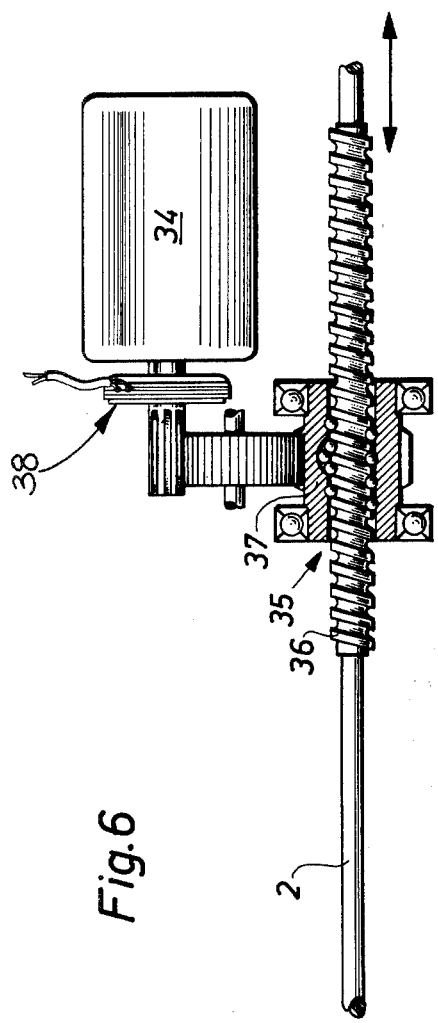
FIG. 6 is a schematic elevation view, partially in section, showing a further embodiment of the present invention.
Figure 7:
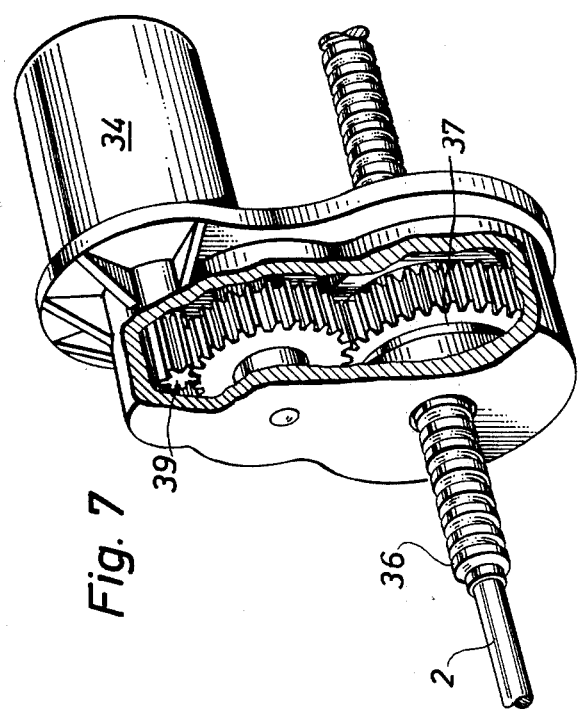
FIG. 7 is an enlarged perspective view of a gearing arrangement as schematically illustrated in FIG. 6.

While the above discussion of this invention has been directed to reliance upon a hydraulic pressure actuated relieving cylinder means and hydraulic fluid displacing means for generating relieving force, the present invention additionally contemplates that relieving force may be delivered through mechanical gearing means operatively connecting a motive means which supplies rotational motive force and the mechanical linkage portion of a brake means. One such embodiment of the present invention is illustrated in FIGS. 6 and 7, where the motive means takes the form of a direct current motor 34. By means of suitable gearing including a ball screw generally indicated at 35, the motive means is operatively connected with the mechanical linkage of the brake means for transmitting motive force thereto and thereby delivering relieving force. More particularly, a push rod 2, or any link connected thereto, is provided with a thread 36, engaged by a nut housing 37 which includes internal ball returns. The nut housing 37 is driven in rotation by the direct current motor 34 preferably through a clutch device 38 which is operated by a sensor signal. The motive means or electrical motor 34 may be energized by either a sensor signal or signals as described above or by an appropriate fluid pressure signal (as from the brake light signal switch), with the nut housing 37 being driven as soon as the sensor signals. With rotation of the nut housing 37, the rod 2 will be displaced (to the left in FIG. 6), thereby opposing the braking force. Another such embodiment (not shown) may use a rack and pinion gearing.

It is believed that persons skilled in the applicable arts will be able to apply the present invention to pneumatically actuated systems comparable to or cooperating with the particular hydraulic fluid and electrical arrangements which have been described in detail.

In the drawings and specification, there has been set forth a preferred embodiment of the invention, and although specific terms are employed, they are used in a generic and descriptive sense only and not for purposes of limitation.

That which is claimed is:

1. In apparatus for braking a rotating member which has brake means, pneumatically actuated wheel chamber means for applying to said brake means braking force which retards rotation of the rotating member and including a mechanical linkage directly connected to said brake means and to said chamber means for transmitting braking force from said chamber means to said brake means, and sensor means for signalling the occurrence of wheel slip, that improvement which comprises motive means operative independently of said chamber means and connected with said mechanical linkage for applying to said mechanical linkage relieving force opposing the braking force transmitted therethrough, said motive means comprising reservoir means for containing hydraulic fluid, hydraulic pressure actuated relieving cylinder means having a piston directly connected to said mechanical linkage, conduit means for establishing operative communication between said relieving cylinder means and said reservoir means, pump means interposed in said conduit means for pumping hydraulic fluid from said reservoir means to said relieving cylinder means, and control valve means interposed in said conduit means for normally accommodating free flow of hydraulic fluid from said reservoir to said relieving cylinder means and from said relieving cylinder means to said reservoir means, said control valve means being responsive to said sensor means for controllably blocking flow of hydraulic fluid from said relieving cylinder means and thereby cooperating with said pump means for generating relieving force.

2. Apparatus according to claim 1 and further comprising means for applying pressure to hydraulic fluid contained in said reservoir means and thereby for precluding cavitation within said pump means.

3. Apparatus according to claim 1 wherein said conduit means comprises supply conduit means in which said pump means is interposed and return conduit means for returning hydraulic fluid from said relieving cylinder means to said reservoir means, and further wherein said control valve means is interposed in said return conduit means for normally permitting free flow of hydraulic fluid therethrough and operatively responsive to said sensor means for blocking flow of hydraulic fluid therethrough.

4. Apparatus according to claim 1 wherein said conduit means consists of a single conduit for passing bi-directional flow and said pump means comprises valve actuator means operatively coupled to said control valve means for normally conditioning said control valve means for free passage of hydraulic fluid in either direction through said conduit means, said valve actuator means being operatively responsive to said sensor means for conditioning said control valve means for blocking hydraulic fluid flow from said relieving cylinder means to said reservoir while passing pumped hydraulic fluid flow from said reservoir to said relieving cylinder means.

5. Apparatus for avoiding locking during braking of a rotating vehicle wheel and comprising brake means; pneumatically actuated wheel chamber means for applying to said brake means braking force which retards rotation of the wheel and including a mechanical linkage directly connected to said brake means and to said chamber means for transmitting braking force from said chamber means to said brake means; sensor means for signalling the occurrence of wheel slip; and hydraulically actuated means operative independently of said pneumatically actuated means and connected with said mechanical linkage for applying to said mechanical linkage relieving force opposing the braking force transmitted therethrough, said hydraulically actuated means having reservoir means for conntaining hydraulic fluid, relieving cylinder means, piston means directly connected to said mechanical linkage, conduit means for establishing operative communication between said relieving cylinder means and said reservoir means, pump means interposed in said conduit means for pumping hydraulic fluid from said reservoir means to said relieving cylinder means, and control valve means interposed in said conduit means for normally accommodating free flow of hydraulic fluid from said reservoir to said relieving cylinder means and from said relieving cylinder means to said reservoir means, said control valve means being responsive to said sensor means for controllably blocking flow of hydraulic fluid from said relieving cylinder means and thereby cooperating with said pump means for generating relieving force.

6. Apparatus for avoiding locking during braking of the rotating wheels of a vehicle and comprising a brake system for applying braking force including brake means at each of a plurality of wheels, each brake means having a pneumatically actuated wheel chamber for applying braking force which retards rotation of the respective wheel and a mechanical linkage directly connected to said brake means and to said chamber for transmitting braking force from said chamber to said brake means, sensor means for signalling the occurrence of wheel slip; and hydraulically actuated means operative independently of said brake means and connected with said mechanical linkage of each said brake means for applying to said mechanical linkage relieving force opposing the braking force transmitted therethrough, said hydraulically actuated means comprising reservoir means for containing hydraulic fluid, a plurality of relieving cylinder means each having a piston directly connected with a respective one of said mechanical linkages, conduit means for establishing operative communication between said reservoir means and respective ones of said relieving cylinder means, pump means interposed in said conduit means for pumping hydraulic fluid from said reservoir means to said relieving cylinder means, and control valve means interposed in said conduit means for normally accommodating free flow of hydraulic fluid from said reservoir to respective ones of said relieving cylinder means and from said relieving cylinder means to said reservoir means, said control valve means being responsive to said sensor means for controllably blocking flow of hydraulic fluid from said respective relieving cylinder means and thereby cooperating with said pump means for generating relieving force.

7. In a method of avoiding locking of a rotating member braked by force generated by a pneumatically actuated wheel chamber means and transmitted through a mechanical linkage directly from said chamber means to a brake and which includes sensing occurrence of a rate of retardation of the rotating member which exceeds a predetermined rate indicative of a tendency of the rotating member to lock, the improvement which comprises normally accommodating free flow of hydraulic fluid from a reservoir to a relieving cylinder and from the relieving cylinder to the reservoir, responding to a sensed occurrence of an excessive rate of retardation of the rotating member by blocking flow of hydraulic fluid from the relieving cylinder to the reservoir, and pumping hydraulic fluid from the reservoir to the relieving cylinder for generating a relieving force acting directly on a piston connected directly to the mechanical linkage and thereby opposing the braking force transmitted therethrough.

8. A method according to claim 7 wherein the step of normally accommodating free flow comprises maintaining a single conduit open for flow in either direction from or to the reservoir.

9. A method according to claim 7 wherein the step of normally accommodating free flow comprises passing fluid from the reservoir to the relieving cylinder through a supply conduit and returning hydraulic fluid from the relieving cylinder to the reservoir through a return conduit, and further wherein the step of blocking comprises closing the return conduit.

10. In apparatus for braking a rotating member which has brake means and pneumatically actuated wheel chamber means for applying to said brake means braking force which retards rotation of the rotating member and including a mechanical linkage directly connected to said brake means and to said chamber means for transmitting braking force from said chamber means to said brake means, and sensor means for signalling the occurrence of wheel slip, that improvement which comprises hydraulically actuated means operative independently of said pneumatically actuated means and connected with said mechanical linkage for applying to said mechanical linkage relieving force opposing the braking force transmitted therethrough, said hydraulically actuated means comprising reservoir means for containing hydraulic fluid, relieving cylinder means, piston means connected directly to said mechanical linkage, supply conduit means for establishing operative communication from said reservoir means to said relieving cylinder means, return conduit means for establishing operative communication from said relieving cylinder means to said reservoir means, pump means interposed in said supply conduit means for pumping hydraulic fluid from said reservoir means to said relieving cylinder means, means for applying pressure to hydraulic fluid contained in said reservoir means and thereby for precluding cavitation within said pump means, and control valve means interposed in said return conduit means for normally permitting free flow of hydraulic fluid therethrough and operatively responsive to said sensor means for controllably blocking flow of hydraulic fluid from said relieving cylinder means to said reservoir means and thereby cooperating with said pump means for generating relieving force acting on said piston means and thereby on said mechanical linkage.

11. Apparatus according to claim 10 further comprising pneumatically actuated servo means for operating said control valve means.

* * * * *